(12) United States Patent
Armbruster et al.

(10) Patent No.: US 10,082,822 B2
(45) Date of Patent: Sep. 25, 2018

(54) TIME SYNCHRONIZATION IN A COMMUNICATIONS NETWORK WITH A PLURALITY OF NETWORK NODES

(71) Applicant: SIEMENS AKTIENGESELLSCHAFT, München (DE)

(72) Inventors: Michael Armbruster, München (DE); Michael Bernhard Buhl, Grafing (DE); Dragan Obradovic, Ottobrunn (DE)

(73) Assignee: Siemens Aktiengesellschaft, München (DE)

(*) Notice: Subject to any disclaimer, the term of this patent is extended or adjusted under 35 U.S.C. 154(b) by 189 days.

(21) Appl. No.: 14/897,183

(22) PCT Filed: May 23, 2014

(86) PCT No.: PCT/EP2014/060699
§ 371 (c)(1),
(2) Date: Dec. 9, 2015

(87) PCT Pub. No.: WO2014/198517
PCT Pub. Date: Dec. 18, 2014

(65) Prior Publication Data
US 2016/0124459 A1    May 5, 2016

(30) Foreign Application Priority Data
Jun. 10, 2013 (DE) .................. 10 2013 210 775

(51) Int. Cl.
G06F 1/10 (2006.01)
H04J 3/06 (2006.01)
H04J 3/14 (2006.01)

(52) U.S. Cl.
CPC .............. *G06F 1/10* (2013.01); *H04J 3/0638* (2013.01); *H04J 3/14* (2013.01); *H04J 3/0667* (2013.01); *H04J 3/0673* (2013.01)

(58) Field of Classification Search
CPC ...... H04J 3/0638; H04J 3/0673; H04J 3/0667; H04J 3/14; G06F 1/10
See application file for complete search history.

(56) References Cited

U.S. PATENT DOCUMENTS

2006/0203851 A1   9/2006   Eidson
2008/0273527 A1*  11/2008  Short .................... H04J 3/0655
                                                370/364

(Continued)

FOREIGN PATENT DOCUMENTS

CN    1835433 A    9/2006
CN    101142773 A   3/2008

OTHER PUBLICATIONS

"7. Clock synchronization model for a bridged local area network (Informative)," as-mjt-clause-7-d0-1009, IEEE SPA, bd. 802.1, nr. d0-1009, pp. 1-8, 2009.

(Continued)

*Primary Examiner* — Kim T Nguyen
(74) *Attorney, Agent, or Firm* — Lempia Summerfield Katz LLC

(57) ABSTRACT

One or a plurality of sub-networks are defined in the communications network. Each of the sub-networks includes a plurality of network nodes from the communications network. One or a plurality of the sub-networks represent pre-determined sub-networks, in which respective pre-determined network nodes have both the function of a global slave node and the function of a local master node. The one or the other network nodes of the respective pre-determined sub-networks are local slave nodes. In addition to global synchronization using the global master node (Continued)

and the global slave nodes, local synchronization is also performed in the pre-determined sub-networks using the local master node and the local slave nodes. Thus, in the event of an error outside a pre-determined sub-network, the local synchronization may be continued, whereas the global synchronization is aborted. It is thus avoided that an erroneous synchronization is propagated into corresponding sub-networks.

19 Claims, 1 Drawing Sheet

(56) References Cited

U.S. PATENT DOCUMENTS

| | | | |
|---|---|---|---|
| 2009/0228732 A1 | 9/2009 | Budde et al. | |
| 2010/0098202 A1* | 4/2010 | Lai | H04J 3/0673 375/356 |
| 2011/0002429 A1* | 1/2011 | Williams | H04J 3/0632 375/356 |
| 2012/0250704 A1* | 10/2012 | Yamada | H04J 3/0661 370/503 |
| 2013/0100832 A1 | 4/2013 | Flinn et al. | |

OTHER PUBLICATIONS

"Epsilon Synchronization Supply Unit Model ESSU," Spectracom, Timing & Synchornization; pp. 1-3, XP05132496, 2012.
German Office action for related German Application No. 10 2013 210 775.7, dated Nov. 20, 2013, with English Translation.
Jasperneite J et al: "Enhancements to the time synchronization standard IEEE-1588 for a system of cascaded brigdes," Factory Communication Systems, Proceedings. 2004 IEEE International Workshop on Vienna, Austria, pp. 239-244, ISBN: 978-0-7803-8734-8, DOI: 10.1109/WFCS.2004.1377716, XP010756406, 2004.
Oulette et al:"Simulations of a chain of Telecom Boundary Clocks combined with Synchronous Ethernet for phase/time transfer," Precision clock synchronization for measurement control and communication (ISPCS), 2011 International IEEE Symposium on IEEE, pp. 105-113, ISBN: 978-1-61284-893-8, DOI: 10.1109/ISPCS.2011.6070143, XP031974494, 2011.
PCT International Search Report and Written Opinion of the International Searching Authority dated Aug. 13, 2014 for corresponding PCT/EP2014/060699.
Chinese Office Action for related Chinese Application No. 201480033078.1 dated Jul. 5, 2017.

* cited by examiner

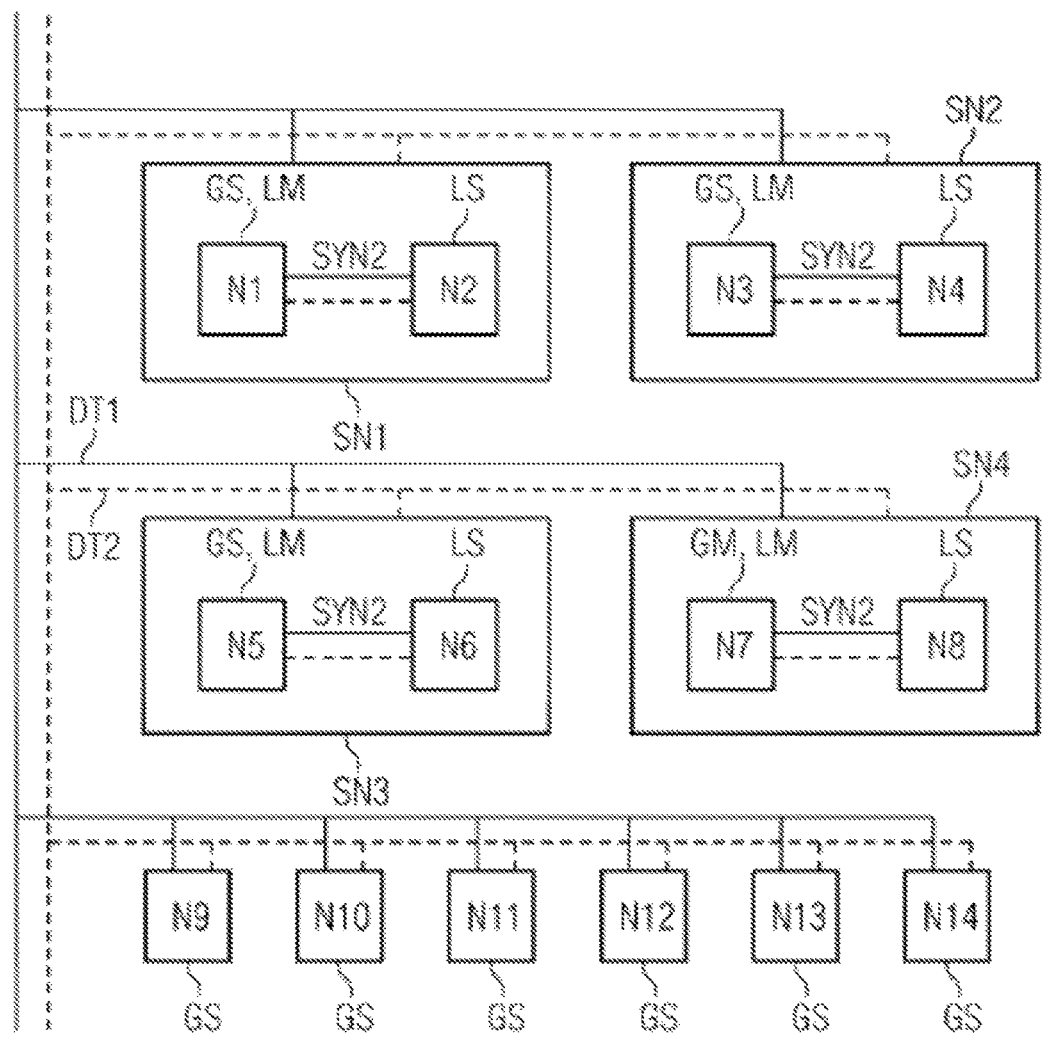

TIME SYNCHRONIZATION IN A COMMUNICATIONS NETWORK WITH A PLURALITY OF NETWORK NODES

CROSS-REFERENCE TO RELATED APPLICATIONS

The present patent document is a § 371 nationalization of PCT Application Serial Number PCT/EP2014/060699, filed May 23, 2014, designating the United States, which is hereby incorporated by reference, and this patent document also claims the benefit of DE201310210775, filed on Jun. 10, 2013, which is also hereby incorporated by reference.

TECHNICAL FIELD

The present embodiments relate to time synchronization in a communications network with a plurality of network nodes.

BACKGROUND

In communications networks having a plurality of network nodes, the processes performed by the network nodes may be adapted to one another. For this purpose, methods for time synchronization in which clocks contained in the network nodes are synchronized to the clock of a master node are used. One example of a method for time synchronization is the Precision Time Protocol, which is defined in the IEEE 1588 and IEEE 1588v2 standard, respectively. In this protocol, a synchronization message is sent out with the timestamp of the clock of the master mode to other network nodes in the form of slave nodes. The slave nodes update the time information contained in the synchronization message based on delays estimated by the slave nodes, which take into consideration the transmission time of the synchronization message from the preceding network node and an internal processing time.

Conventional methods for time synchronization have the disadvantage that, in the case of a fault in the master node, the synchronization becomes faulty in all slave nodes, which leads to a fault propagation with regard to the timing characteristic in the entire communications network. As a consequence, synchronism may no longer be guaranteed for all parts of the network.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for time synchronization in a communications network in which a fault propagation in the case of faulty time synchronization is limited is provided.

The method is used for time synchronization in a communications network with a plurality of network nodes. Each of the network nodes includes a clock, and a network node is a global master node to the clock of which the clocks of other network nodes are to be synchronized. In the communications network, one or more subnetworks that include in each case a plurality of network nodes from the communications network are provided. One or more of the subnetworks respectively represent a predetermined subnetwork in which a predetermined network node has both the function of a global slave node and the function of a local master node, and the one or the other network nodes of the respective predetermined subnetwork are local slave nodes.

In the method, a global synchronization in which first synchronization messages are transmitted between network nodes with a time information that is based on the clock of the global master node is performed. The predetermined network nodes, in function as global slave nodes, synchronize to the clock of the global master node. For performing the global synchronization, synchronization methods known may be used (e.g., the synchronization may be based on the abovementioned Precision Time Protocol or on the IEEE 1588 or IEEE 1588v2 or IEC 61158 or IEEE 802.1AS standards, respectively).

Apart from the global synchronization described above, in each predetermined subnetwork in the method, a local synchronization in which second synchronization messages are transmitted between network nodes with a time information that is based on the clock of the predetermined network node in function as local master node is performed separately. The local slave nodes of the respective predetermined subnetwork become synchronized to the clock of the predetermined network node.

For the local synchronization, the standards defined above that are used for the global synchronization may be used analogously. The synchronization is to be limited only to the subnetworks that may be achieved appropriately by identifiers in the second synchronization messages.

In the case that in a predetermined subnetwork a fault caused outside the predetermined subnetwork is detected in the global synchronization, the predetermined network node of the predetermined subnetwork aborts the synchronization of the clock of the predetermined network node to the clock of the global master node. The local synchronization is continued in the predetermined subnetwork. In the case of a faulty global master node, synchronism is still retained within previously defined subnetworks.

Using the method, it is achieved that a fault in the global synchronization is not transferred into subnetworks of the communications network, but a local synchronization is still continued there. This avoids fault propagation of a synchronization fault into predefined subnetworks.

In an embodiment, the method is used in a communications network that, apart from the subnetworks, also includes one or more single network nodes that do not belong to any subnetwork. These individual network nodes are included in the global synchronization (e.g., these network nodes also become synchronized via first synchronization messages and also forward these synchronization messages).

An individual network node without associated subnetwork may be a global master node. In one embodiment, the global master node is a network node of a further subnetwork that is contained in the communications network. In this case, the global master node also handles the function of a local master node, and the one or the other network nodes of the further subnetwork are local slave nodes. Analogously to the predetermined subnetworks, a local synchronization in which second synchronization messages are transmitted between network nodes with a time information that is based on the clock of the global master node in function as local master node is performed separately in the further subnetwork. The local slave nodes of the further subnetwork are synchronized to the clock of the global master node. Due to the additional local synchronization in a further subnetwork, a faulty function of the global master node may be rapidly found so that the sending-out of synchronization messages with wrong time information may be prevented at an early stage.

In a further variant of the method, all subnetworks of the communications network, apart from the further subnetwork, are predetermined subnetworks. This provides local synchronization covering the entire communications network.

In a further embodiment of the method, the second synchronization messages are transmitted exclusively between network nodes of the respective subnetwork in which the local synchronization is performed. For example, this may be achieved in that, in the second synchronization messages, it is specified in each case which subnetwork the second synchronization message belongs to.

The individual subnetworks may be defined, for example, as virtual local area networks (VLANs). VLANs are known sufficiently from the prior art. In this context, the specification of the corresponding subnetwork in the second synchronization messages may be reached via a corresponding VLAN tag.

The detection of a fault in the global synchronization may take place in arbitrary manner in a predetermined subnetwork. For example, a fault may be detected if a first synchronization message is no longer received in the predetermined network nodes of the predetermined subnetwork within a predetermined period of time and/or when the predetermined network node finds that the received first synchronization message is faulty and/or when the predetermined network node finds that a deviation between a time resulting from the first synchronization messages and a time resulting from the clock of the predetermined network node exceeds a predetermined threshold.

In a variant of the method, in the case that in a subnetwork that may be the predetermined and possibly also the further subnetwork or in an individual network node belonging to no subnetwork, a fault caused in the subnetwork or the individual network node is detected in the global and/or local synchronization, and the subnetwork or the individual network node in the communications network is deactivated (e.g., the individual subnetwork or the individual network node are no longer part of the communications network). By this, network nodes operating in a faulty manner are removed efficiently from the communications network.

A predetermined function may be allocated to each subnetwork of the communications network that is executed by the network nodes of the respective subnetwork. This predetermined function may be frequently continued also in the event of a failure of the global synchronization. The network nodes of a subnetwork may then perform the predetermined function jointly. Similarly, the network nodes of a subnetwork may be redundant network nodes that perform the same predetermined function. The method for time synchronization may be used in any technical fields of application. For example, the communications network is a component of transportation device such as, for example, a rail vehicle, a motor vehicle, or an aircraft. The network nodes represent control units in the transportation device.

Apart from the method described above, an embodiment also relates to a communications network with a plurality of network nodes. The network nodes are configured to perform acts of the method or, respectively, of one or more variants of the method.

BRIEF DESCRIPTION OF THE DRAWINGS

FIG. 1 depicts a diagrammatic representation of a communications network in which a variant of the method for time synchronization is performed.

DETAILED DESCRIPTION

The communications network shown in FIG. 1 includes a plurality of network nodes N1, N2, N3, . . . , N14. In this context, the communications network may be used in any technical applications. For one use, the individual network nodes represent the components of a flight control or drive control system in an aircraft or vehicle respectively (e.g., rail vehicle or motor vehicle). The network nodes N1 to N8 may be, for example, central control computers in the system, whereas the network nodes N9 to N14 represent, for example, sensors or actuators. In the communications network of FIG. 1, the individual network nodes may communicate with one another via logical data transport channels. A data transport channel DT1 is indicated, for example, by solid lines, and a further data transport channel DT2 is indicated by dashed lines. The communications network includes four subnetworks SN1, SN2, SN3 and SN4. Each of the four subnetworks SN1, SN2, SN3 and SN4 includes two network nodes N1, N2 and N3, N4 and, respectively, N5, N6 and N7, N8. The network nodes of a respective subnetwork may jointly handle a function or be redundantly designed. In the case of redundant design, each network node in the subnetwork performs the same function. As a result of this, the system in which the communications network is used is protected better against failures of network nodes.

Each of the network nodes from FIG. 1 includes an internal clock with a particular clock frequency. The clocks are synchronized with one another in the communications network. In this context, the hierarchical synchronization described below, in which global synchronization of the clocks is achieved over all subnetworks and a local synchronization of the clocks is achieved within the subnetworks, is used. To perform the synchronization, a global master node GM is specified in the communications network of FIG. 1, which is network node N7 of the subnetwork SN4. In the other subnetworks, corresponding global slave nodes GS are specified. For the subnetwork SN1, the global slave node of the nodes is N1. For the subnetwork SN2, the global slave node is network node N3. For the subnetwork SN3, the global slave node is network node N5. These network nodes N1, N3 and N5 also handle the function of a local master node LM for local synchronization. The local synchronization is described further below. In addition, the individual network nodes N9, N10, . . . , N14 that are not allocated to any subnetwork also represent global slave nodes GS.

As part of the global synchronization, the clocks of the global slave nodes are synchronized to the clock of the global master node by the exchange of first synchronization messages between the global master node GM and the global slave nodes GS. In this context, a first synchronization message is designated by the reference symbol SYN1 by way of example in FIG. 1. Synchronization by the first synchronization messages is based on the Precision Time Protocol (Standard IEEE 1588 or IEEE 1588v2) known from the prior art. Within the scope of this standard, the global master node GM sends out a first synchronization message with a time stamp of its clock at the time of sending out. The global slave nodes GS process this information and again send out first synchronization messages. In this context, each slave node adds the estimated delay between the sending-out time of the synchronization message in the preceding node and its own sending-out time to the timestamps of the received synchronization message. By way of the time information of a received first synchronization message, a global slave node may become synchronized to the clock of the global master node.

The first synchronization messages are also exchanged in the communication network between network nodes that are not global slave nodes. In this context, each network node that receives a first synchronization message adds the estimated delay, described above, in the message. However, a synchronization to the clock of the global master node GM is performed only by the global slave nodes GS. This provides that the other nodes (e.g., nodes N2, N4 and N6) do not become synchronized to the clock of the global master node even when the other nodes are processing and forwarding the first synchronization messages.

Apart from the global synchronization explained above, a local synchronization of the network nodes of the subnetworks is also performed separately in each of the subnetworks SN1 to SN4. This local synchronization continues also in the case of a failure of the global synchronization so that the tasks of the network nodes of the subnetworks may still be carried out. As part of the local synchronization of the individual subnetworks, the network nodes N1, N3, N5 and N7 also represent local master nodes LM. By way of an exchange of second synchronization messages SYN2 in each subnetwork, the clock of the corresponding node N2, N4, N6 and N8, respectively, is synchronized to the clock of the local master node N1, N3, N5 and N7, respectively. The local synchronization based on the second synchronization messages again uses the Precision Time Protocol, which, however, is performed only locally in the individual subnetworks analogously to the global synchronization.

In an embodiment, the individual subnetworks SN1 to SN4 are configured as VLANs. In this context, it is specified via a VLAN tag of the Ethernet frame of the second synchronization message which VLAN the second synchronization message belongs to. This makes it possible to achieve that second synchronization messages are forwarded only in the associated subnetwork. In the network of FIG. 1, the individual subnetworks include only a pair of network nodes. Nonetheless, a much greater number of network nodes may also be provided in the individual subnetworks in other applications.

In each of the subnetworks of FIG. 1, mechanisms are implemented for finding faults in the global and local synchronization. For example, a fault in the global or local synchronization may be found via checksums in the first or second synchronization messages, respectively. If the checksum of the message may not be verified, the corresponding synchronization message is faulty, and a fault is detected in the global or local synchronization, respectively. A further mechanism for the detection of a fault in the global synchronization may consist in that it is found that no further first synchronization messages are received in the corresponding network nodes N1, N3 and N5. If then a fault is detected in the synchronization in a subnetwork that has been caused outside of this subnetwork, the corresponding global slave node GS no longer becomes synchronized to the clock of the global master node GM in order to prevent its clock from being set wrongly. Independently of this, however, the local synchronization is continued in the subnetwork so that functions of the subnetwork may still be performed even if the global synchronization between the network nodes no longer functions. Analogously, the individual network nodes N9 to N14 not belonging to a subnetwork also do not continue the global synchronization of clocks of the individual network nodes N9 to N14 to the global master GM if the individual network nodes N9 to N14 detect a fault in the global synchronization that is not caused by the individual network nodes N9 to N14. Nevertheless, the individual network nodes may still perform the allocated function, if necessary.

If, in contrast, a fault is detected in the synchronization by an individual network node or a network node in a subnetwork that has been caused in the corresponding subnetwork or by the individual network node, the individual network node or the subnetwork is switched off in the communications network. This effectively avoids malfunctions in the communications network.

The embodiment described in the preceding text has a number of advantages. For example, using a global and a local synchronization has the result that random hardware faults in the global master node do not lead to the failure of the synchronization in all subnetworks. Instead, the local synchronization of the network nodes is maintained in the subnetworks so that the subnetworks still remain operable by way of the local synchronization. In consequence, the failure of the global synchronization does not represent a total failure of all network nodes in the communications network.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for time synchronization in a communications network with a plurality of network nodes, wherein each network node of the plurality of network nodes comprises a clock, and a network node of the plurality of network nodes is a global master node to the clock of which the clocks of other network nodes of the plurality of network nodes are to be synchronized, wherein, in the communications network, one or more subnetworks each comprise a subset of network nodes of the plurality of network nodes from the communications network wherein the communication network further comprises one or more single network nodes that do not belong to any of the one or more subnetworks, wherein at least one subnetwork of the one or more subnetworks or one single network node of the one or more single network nodes represents at least one predetermined subnetwork or predetermined single network node in which a respective predetermined network node of the plurality of network nodes functions as a global slave node and functions as a local master node, and one or more network nodes of the plurality of network nodes of the respective predetermined subnetwork are local slave nodes, the method comprising:

performing a global synchronization, the performing of the global synchronization comprising transmitting first synchronization messages between network nodes with time information that is based on a clock of the global master node, the predetermined network nodes of the plurality of network nodes, function as global slave nodes, becoming synchronized to the clock of the global master node;

performing, in each predetermined subnetwork, a local synchronization, the performing of the local synchronization comprising transmitting second synchronization messages between network nodes of the plurality of network nodes with time information that is based on the clock of the predetermined network node of the respective predetermined subnetwork function as the local master node, wherein the local slave nodes of the respective predetermined subnetwork become synchronized to the clock of the predetermined network node; and aborting, by in the case that in a predetermined subnetwork, a fault caused outside the predetermined subnetwork is detected in the global synchronization, a respective predetermined network node of a predetermined subnetwork, aborts the synchronization of the clock of the respective predetermined network node to the clock of the global master node when in the predetermined subnetwork, a fault caused outside the predetermined subnetwork is detected in the global synchronization, the local synchronization being continued in the predetermined subnetwork.

2. The method of claim 1, wherein the global synchronization, the local synchronization, or the global synchronization and local synchronization are based on the IEEE 1588, IEEE 1588v2, IEC 61158, or IEEE 802.1AS standard.

3. The method of claim 1, wherein, apart from the predetermined subnetwork or subnetworks, the communications network includes a further subnetwork of a plurality of network nodes, the further subnetwork comprising the global master node, which also has the function of the local master node, and the other network node or network nodes of the further subnetwork being local slave nodes, and wherein the method further comprises performing the local synchronization in the further subnetwork, the performing of the local synchronization in the further subnetwork comprising transmitting second synchronization messages with the time information that is based on the clock of the global master node in function as the local master node between the plurality of network nodes, the local slave nodes of the further subnetwork becoming synchronized to the clock of the global master node.

4. The method of claim 3, wherein all subnetworks of the communication network, apart from the further subnetwork, are the predetermined subnetworks.

5. The method of claim 1, wherein the second synchronization messages are transmitted exclusively between network nodes of the respective subnetwork in which the local synchronization is performed.

6. The method of claim 1, wherein, in each of the second synchronization messages, it is specified which subnetwork the second synchronization message belongs to.

7. The method of claim 1, wherein the one or more subnetworks represent VLANs in the communications network.

8. The method of claim 1, further comprising detecting, in a predetermined subnetwork, a fault in the global synchronization when, in the predetermined network node of the predetermined subnetwork, no further first synchronization message is received within a predetermined time interval, when the predetermined network node determines that the received first synchronization message is faulty, when the predetermined network node determines that a deviation between a time resulting from the first synchronization messages and a time resulting from the second synchronization messages from the clock of the predetermined network node exceeds a predetermined threshold, or when any combination thereof occurs.

9. The method of claim 1 wherein in the case that in a subnetwork or in an individual network node belonging to no subnetwork a fault is detected in the global and/or local synchronization which is caused in the subnetwork or the individual network node, further comprising deactivating the subnetwork or the individual network node belonging to no subnetwork in the communications network is deactivated when, in the subnetwork or in the individual network node belonging to no subnetwork, a fault that is caused in the subnetwork or the individual network node is detected in the global synchronization, the local synchronization, or the global synchronization and the local synchronization.

10. The method of claim 1, wherein a predetermined function is allocated to each subnetwork, the predetermined function being executed by the network nodes of the respective subnetwork.

11. The method of claim 10, wherein the network nodes of a respective subnetwork perform the predetermined function jointly or are redundant network nodes that perform the same predetermined function.

12. The method of claim 1, wherein the communications network is a component of a transportation device, the plurality of network nodes representing control units in the transportation device.

13. The method of claim 1, wherein the one or more single network nodes comprise sensors, actuator, or sensors and actuators.

14. A communications network comprising:
a plurality of network nodes, each network node of the plurality of network nodes comprising a clock, wherein at least one of the plurality of network nodes does not belong to any of one or more subnetworks; and
a network node that is a global master node, wherein clocks of the plurality of network nodes are to be synchronized to a clock of the global master node, the one or more subnetworks being specified in the communications network, each subnetwork of the one or more subnetworks comprising a subset of network nodes of the plurality of network nodes from the communications network, at least one of the subnetworks representing a respective predetermined subnetwork in which a predetermined network node both functions as a global slave node and a local master node and the other network node or nodes of the respective predetermined subnetwork are local slave nodes,
wherein a global synchronization is performable with the plurality of network nodes, the global synchronization comprising transmission, between network nodes, of first synchronization messages with time information that is based on the clock of the global master node, the predetermined network nodes function as global slave nodes, becoming synchronized to the clock of the global master node;
wherein in each predetermined subnetwork, a local synchronization is performable, the local synchronization comprising transmission of second synchronization messages between network nodes of the plurality of network nodes with time information that is based on the clock of the predetermined network node of the respective predetermined subnetwork function as local master node, the local slave nodes of the respective predetermined subnetwork becoming synchronized to the clock of the predetermined network node; and wherein when in a predetermined subnetwork a fault caused outside the predetermined subnetwork is detected in the global synchronization, the predetermined network node of the predetermined subnetwork is configured to abort the synchronization of the clock of the predetermined network node to the clock of the global master node, the local synchronization being continued in the predetermined subnetwork.

15. The communications network of claim 14, further including a further subnetwork of a plurality of network nodes, the further subnetwork comprising the global master node, which also has the function of the local master node and the other network node or network nodes of the further subnetwork being the local slave nodes, and wherein the method further comprises performing the local synchronization in the further subnetwork, the performing of the local synchronization in the further subnetwork comprising transmitting the second synchronization messages with the time information that is based on the clock of the global master node, function as the local master node between the plurality of network nodes the local slave nodes of the further subnetwork becoming synchronized to the clock of the global master node.

16. The communications network as claimed in claim 15 wherein all subnetworks of the communication network, apart from the further subnetwork, are predetermined subnetworks.

17. The communications network as claimed in claim 14 wherein the second synchronization messages are transmitted exclusively between network nodes of the respective subnetwork in which the local synchronization is performed.

18. The communications network as claimed in claim 14 wherein, in each of the second synchronization messages, it is specified which subnetwork the second synchronization message belongs to.

19. The communications network as claimed in claim 14 wherein the one or more subnetworks represent VLANs in the communications network.

* * * * *